(12) United States Patent
Pellenc et al.

(10) Patent No.: US 7,810,306 B2
(45) Date of Patent: Oct. 12, 2010

(54) VIBRATING TONGS WITH AN ADAPTABLE CLAMPING FORCE FOR FRUIT HARVESTING

(75) Inventors: Roger Pellenc, Pertuis (FR); Christian Rolland, Cucron (FR); Bertrand Bouyou, Jaen (ES)

(73) Assignee: Pellenc Iberica, SL, Jaen (ES)

( * ) Notice: Subject to any disclaimer, the term of this patent is extended or adjusted under 35 U.S.C. 154(b) by 0 days.

(21) Appl. No.: 11/776,500

(22) Filed: Jul. 11, 2007

(65) Prior Publication Data
US 2008/0016838 A1    Jan. 24, 2008

(30) Foreign Application Priority Data
Jul. 20, 2006    (FR) .................................. 06 06616

(51) Int. Cl.
*A01D 46/26*    (2006.01)

(52) U.S. Cl. ..................................... 56/340.1

(58) Field of Classification Search ............. 56/10.2 R, 56/328.1, 329, 340.1, 337
See application file for complete search history.

(56) References Cited

U.S. PATENT DOCUMENTS

| | | | |
|---|---|---|---|
| 3,504,486 A | | 4/1970 | Fridley |
| 3,555,799 A | | 1/1971 | Gerrans |
| 3,570,230 A | | 3/1971 | Pool et al. |
| 3,596,455 A | * | 8/1971 | Adrian ......................... 56/329 |
| 3,911,679 A | * | 10/1975 | Matthews ..................... 60/413 |
| 3,972,267 A | * | 8/1976 | Haak et al. .................... 91/445 |
| 4,903,471 A | * | 2/1990 | Bunnelle ..................... 56/340.1 |
| 5,074,108 A | * | 12/1991 | Claxton et al. ................ 56/330 |
| 5,765,349 A | * | 6/1998 | Michelson .................. 56/328.1 |
| 5,927,056 A | * | 7/1999 | Renehan ..................... 56/340.1 |
| 5,997,064 A | * | 12/1999 | Orita ........................ 294/119.1 |
| 6,644,906 B2 | * | 11/2003 | Bayne ......................... 414/408 |

FOREIGN PATENT DOCUMENTS

FR    2799610 A1 *    4/2001

* cited by examiner

*Primary Examiner*—Thomas B Will
*Assistant Examiner*—Joan D Misa
(74) *Attorney, Agent, or Firm*—Egbert Law Offices PLLC

(57) ABSTRACT

The invention relates to vibrating tongs, including two opposing jaws in which the closing or opening movements are achieved through one or several hydraulic jacks, referred to as clamping jacks. These tongs are especially remarkable in that the oil intake chamber or pressure chamber of the clamping jacks that control the closing motion of the jaw or jaws, is linked to a mechanism fitted to detect any pressure rise inside the chamber that occurs when the tong jaws come into contact with the trunk of a tree. Blocking devices are controlled by the detection mechanism, and any increase in the pressure of the jaws on the trunk is opposed as soon as such a pressure rise occurs in the oil intake chamber.

7 Claims, 5 Drawing Sheets

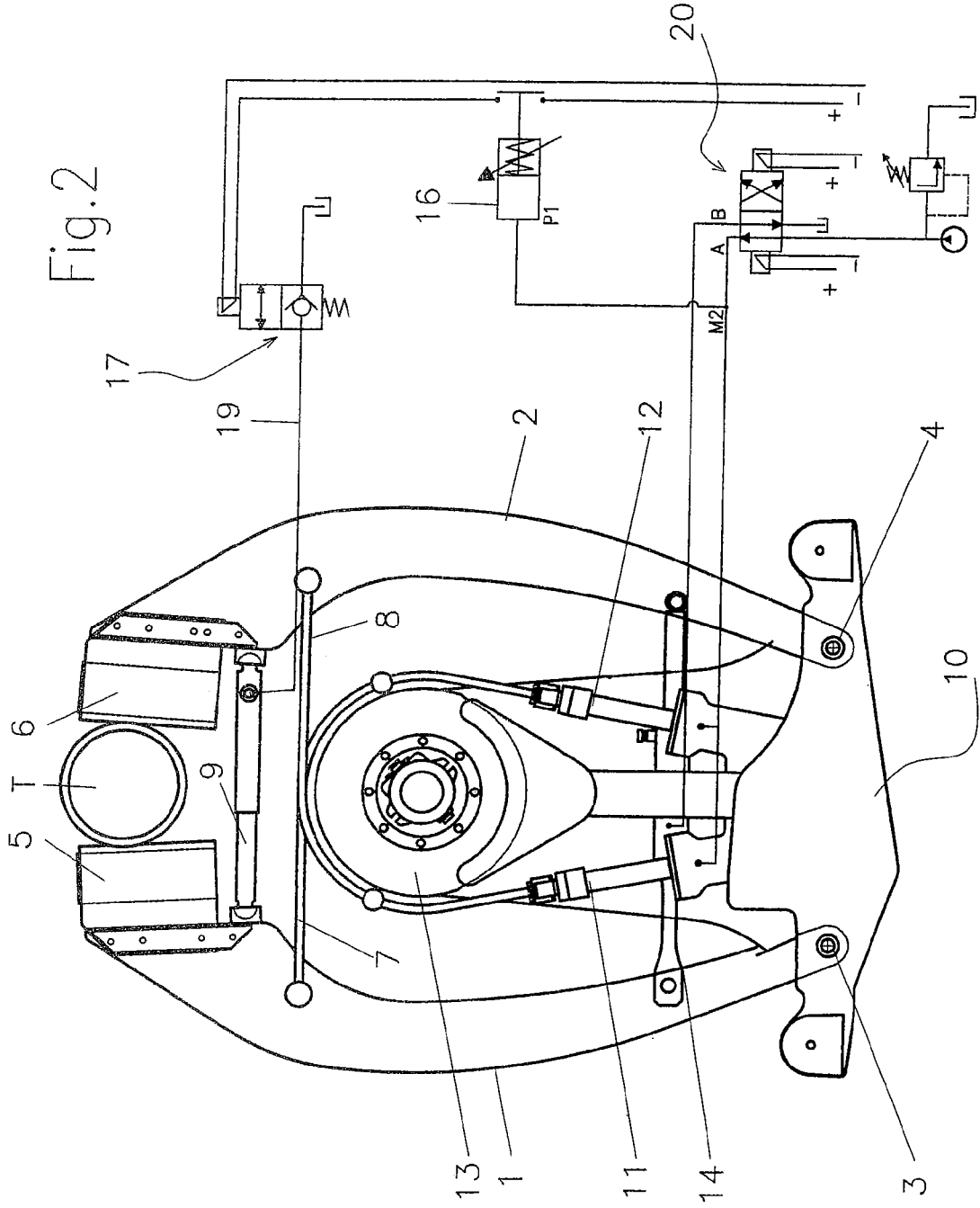

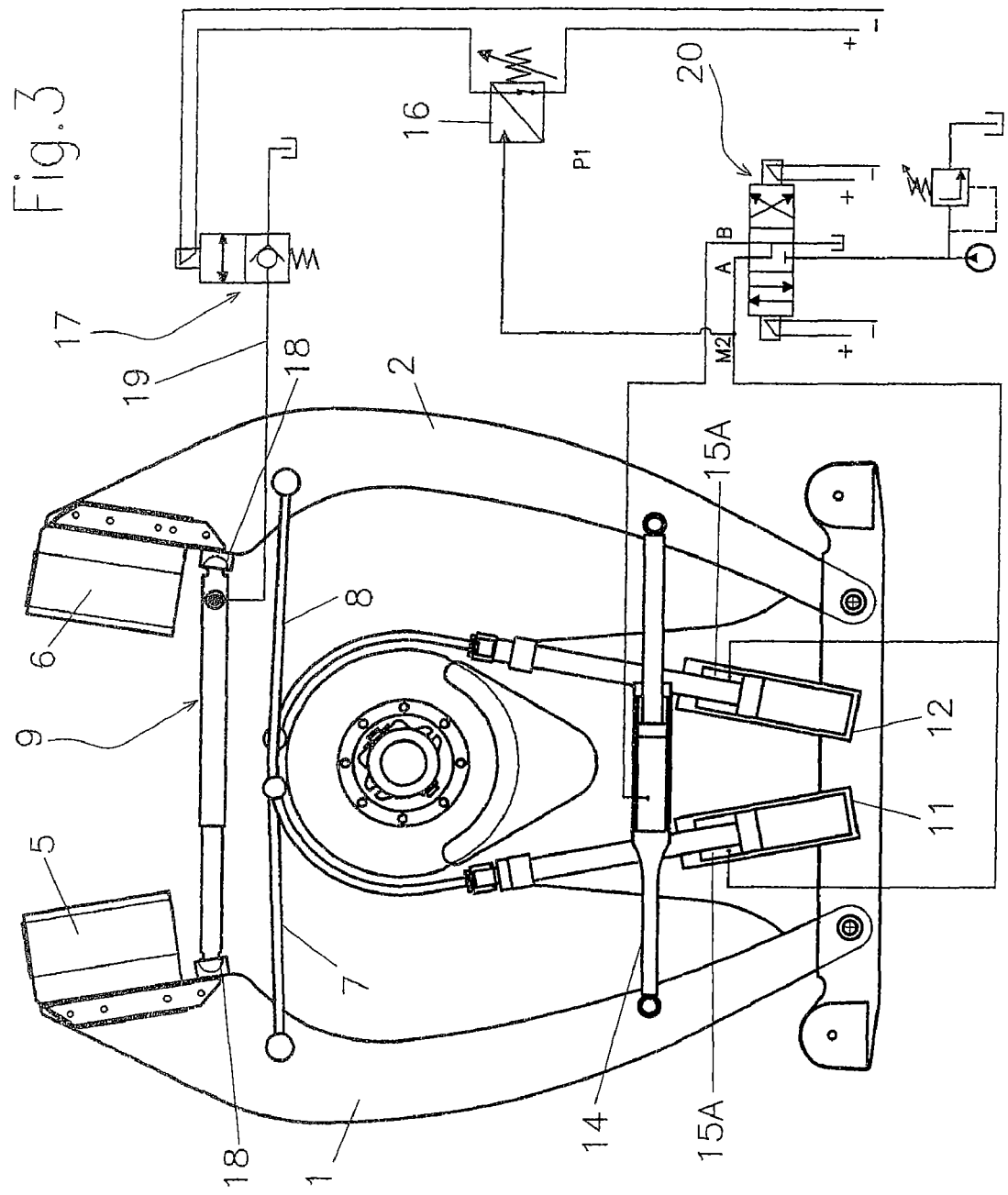

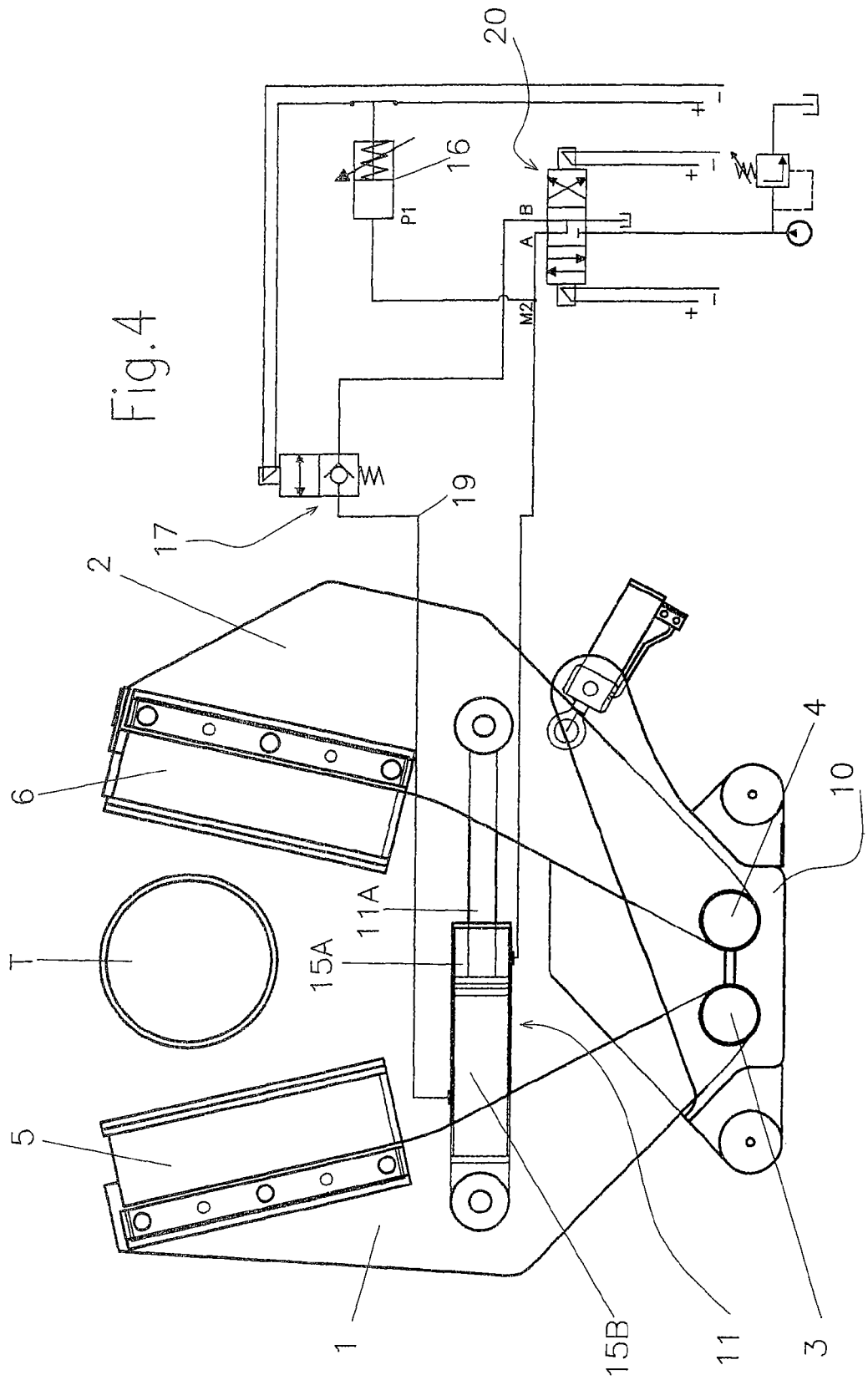

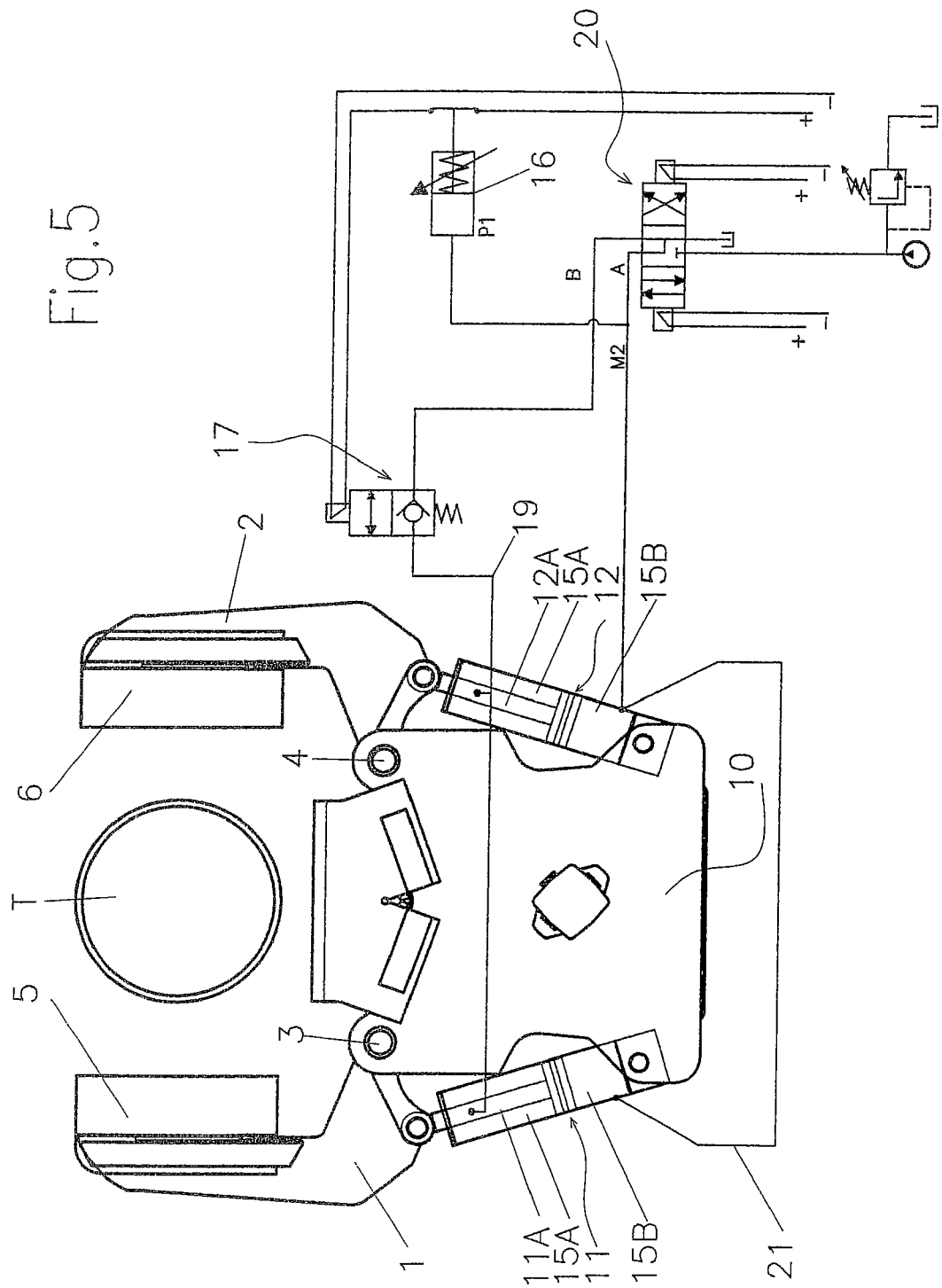

VIBRATING TONGS WITH AN ADAPTABLE CLAMPING FORCE FOR FRUIT HARVESTING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns vibrating tongs with an adaptable clamping force for mechanical fruit harvesting.

2. Description of Related Art Including Information Disclosed Under 37 CFR 1.97 and 37 CFR 1.98.

Mechanical harvesting of fruit and especially small fruits, such as, for example, olives, cherries, almonds, nuts, etc. using vibrating machines is now widely applied by a large number of fruit tree growers. Such machines include in particular a vibration head consisting, on the one hand, of a rugged pair of tongs designed to clamp the trunk and branches of fruit trees and consisting of two jaws or grips of which at least one is a moving jaw and the closing (clamping) and unclamping (opening) movements are achieved through one or more hydraulic jacks and, on the other hand, of a vibrator communicating vibrations to the jaws and allowing for the fruits to be detached. A vibration head of this kind is, for example, described in French Patent No. 2799610.

The resistance of the tree bark to the pressure of the tong jaws may vary considerably, especially in terms of the fruit species, varieties of one same species, the harvesting season, weather conditions, soil moisture (for example, depending on watering), etc.

The clamping force applied by the jaws raises a problem, because it can exert either to much pressure and the bark breaks, or it is too weak; and a substantial amount of effectiveness is lost.

Depending on species and varieties, there are harvesting periods that coincide with those times when the tree sap is rising, in other words, when the sap rises between the bark and the central cylinder of the tree trunk.

During these periods, the tree is more vulnerable because if its bark is damaged, the rise of the sap does not occur normally and the tree will wither quickly and irremediably.

In order to limit the magnitude of damage caused to the bark of trees, it has been proposed (in U.S. Pat. No. 3,555,799; 3,504,486; and 3,570,230) to limit the pressure to a predetermined value (for example 50 bars) in the oil intake chamber of the clamping jack or jacks. However, during activation periods of the vibrator, the pressure in this chamber is considerably increased by the push coming from the opposite direction exerted on the piston moving in said chamber. This results in:

- an instability in the behavior of the clamping jack due to micro-displacements of the piston and the rod of this jack at a high frequency;
- a seizing of the jack shaft in its guide bearing resulting from these high-frequency micro-displacements;
- when the fasteners of the clamping jack are articulated, there is a harmful play in these joints; and
- in a case when there was no flap valve, the pressure of said chamber would be capped by the pressure limiter at each vibration, so that the tongs would open.

BRIEF SUMMARY OF THE INVENTION

One purpose of the invention is to make a vibration head that clamps around and vibrates trunks of fruit-bearing trees, such as, for example, olive trees, almond trees, walnut trees, pistachio trees, hazelnut trees or bushes, chestnut trees, cherry trees, apple trees, plum trees, Mirabelle trees, coffee plants, etc., without damaging their bark and without causing malfunction of the tongs after a more or less short usage period.

According to the invention, this goal is reached by means of vibrating tongs comprised of two opposing jaws in which the closing or opening movements are achieved through one or several hydraulic jacks, referred to below as clamping jacks. These tongs are especially remarkable in that the oil intake chamber or pressure chamber of the clamping jack or jacks that control the closing motion of the jaw or jaws, is linked to a mechanism fitted to detect any pressure rise inside said chamber that occurs when the tong jaws come into contact with the trunk of a tree. Blocking devices are controlled by said detection mechanism, and any increase in the pressure of said jaws on said trunk is opposed as soon as such a pressure rise occurs in said oil intake chamber.

By virtue of this construction, the clamping pressure limitation is not obtained by the preset limitation of the pressure in the clamping jack intake chamber, as in the case of the devices described in the aforementioned documents, but rather by the control of pressure variation in said chamber and by the interposition of an obstacle that opposes any amplification of the pressure force of tong jaws on the trunk as soon as a change in pressure is detected, in other words, as soon as the tong jaws clamp around the tree trunk.

On the other hand, when the blocking mechanism of the vibrating tongs according to this invention is activated, the pressure in the clamping jack is maintained, contrary to the devices described in the prior art documents. Under these conditions, when the vibrator is activated, the jack or jacks that control the clamping of the tree trunk by the jaws of the vibrating tongs remain(s) perfectly stable with the following results:

- taking up play in the fastening connections of this jack or jacks; and
- no seizing of the rod of said jack or jacks.

Preferably and advantageously, the mechanism for detecting the pressure rise and control of the blocking device is adjustable, so as to allow control of said blocking devices depending on different pressures predetermined by the operator.

According to a first execution method, the blocking mechanism consists of a jack referred to as blocking jack hereafter in this presentation, and installed between the jaws of the tongs, so that it opposes the force or pressure of the clamping jack or jacks.

According to an interesting example of implementation of this device, the blocking jack is locked by a solenoid valve controlled by a pressure switch or an adjustable pressure sensor that registers the pressure rise in the chamber or chambers of the clamping jack or jacks that occurs when the rubber cushion or cushions of the jaws come into contact with the tree trunk. The adjustment of this pressure switch thus permits controlling the clamping force exerted on the tree trunk by hermetically closing the blocking jack when the clamping jack or jacks reach a predetermined pressure.

According to another execution method applicable to the vibrating tongs in which the moving jaw or jaws are driven by hydraulic clamping jacks which work by pulling, the pressure rise detection devices are linked to the chamber located on the rod side of said clamping jack or jacks, and these devices include an adjustable pressure switch that electrically controls a tight closing valve, consisting, for example, of a tight flap distributor that allows the oil outlet or discharge to close on the bottom side of said clamping jack or jacks.

According to another execution method applicable to vibrating tongs in which the moving jaw or jaws are actuated by hydraulic clamping jacks which work by pushing the pressure rise detection devices are linked to the chamber located on the bottom side of said clamping jack or jacks. These devices consist of a pressure switch that electrically controls a tight closing valve that allows the oil outlet or discharge to close on the rod side of the clamping jack or jacks.

The invention makes it possible to clamp and vibrate trunks of olive trees or other trees bearing small fruit, without stripping their bark.

The system according to the invention can be installed on all vibrating tongs consisting of one or several mobile jaws and one or several clamping jacks.

BRIEF DESCRIPTION OF THE SEVERAL VIEWS OF THE DRAWINGS

The aforementioned goals, characteristics and advantages and still other ones, shall become more obvious from the description given below and from attached drawings.

FIG. 2 is an identical schematic view of FIG. 1 that shows the tongs in a clamping position on a trunk.

FIG. 3 shows a schematic view of a more precise hydraulic schematic of this execution method of FIG. 1.

FIG. 4 is a schematic view of a second execution method of these vibrating tongs.

FIG. 5 is a schematic view of a third execution method of the invention.

Figure 1:
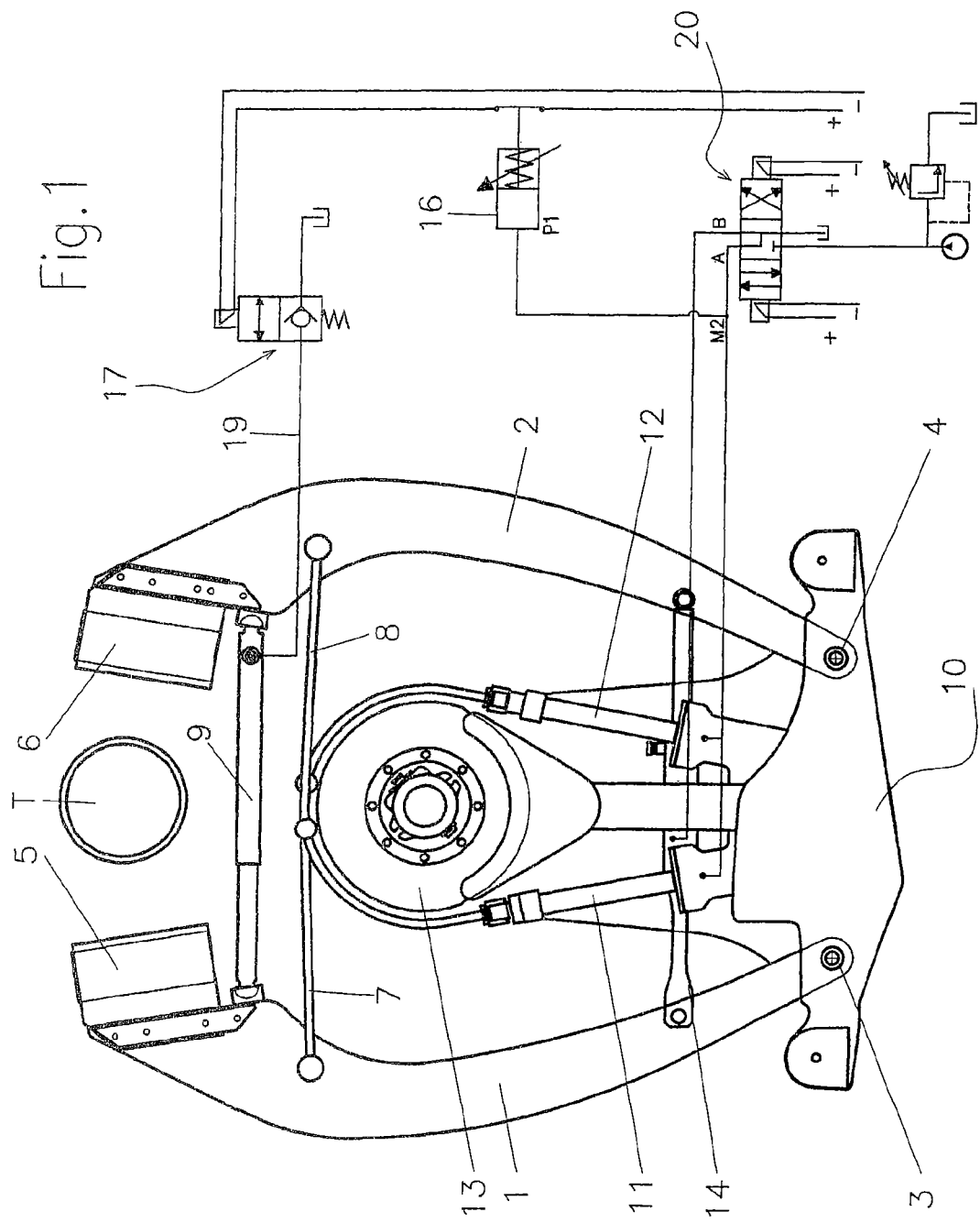
FIG. 1 is a schematic view of a first execution method of the vibrating tongs according to the invention, shown in an open position.

The drawings describe interesting, although by no means limiting, execution methods of the vibrating tongs according to the invention.

DETAILED DESCRIPTION OF THE INVENTION

In the presentation below, the components that perform identical functions in all of the three described methods of execution are designated by the same references.

According to FIGS. 1 through 3, the vibrating tongs classically consist of two opposing jaws 1 and 2 mounted with a pivoting feature on a fixed support 10, around axes 3 and 4, respectively. The free ends of these jaws 1 and 2 are equipped with rubber pads or linings, respectively 5 and 6.

Pivoting of jaws 1 and 2, in a closed position, is accomplished by clamping jacks 11 and 12, respectively, which work by pulling and connecting to said jaws by one or several cables 7 and 8 and winding, for example, on the cylindrical housing 13 that contains the vibrator.

The tongs are opened by means of a hydraulic jack 14, referred to as opening jack hereafter in this presentation. This jack is connected, through its opposite ends and by means of hinges, with jaws 1 and 2 of the tongs, at a reduced articulation distance of the latter on tongs support 10.

Reference 20 designates overall the electro-slide valve providing for the operation of closing jacks 11, 12 and opening jack 14 of the tongs.

According to the invention, the oil intake chamber of pressure chamber 15A of clamping jacks 11 and 12 that controls the closing movement of jaws 1 and/or 2 is linked to a device 16 fitted to detect any rise of oil pressure inside said chamber that occurs when cushions 4, 5 of jaws 1, 2 of the tongs come into contact with trunk T of a tree. The vibrating tongs consist, additionally, of blocking devices 9, 17 controlled by said detection device and counteracting any increase in pressure of said jaws on the trunk as soon as such a rise in pressure is detected in the oil intake chamber or pressure chamber 15A.

According to an advantageous execution method, the device 16 for detecting pressure rise and control of blocking devices 9, 17 is adjustable, so as to allow control of said blocking devices based on different pressures predetermined by the operator.

According to the execution method of FIGS. 1 and 3, said device for detecting and controlling consists of an adjustable pressure switch 16, whereas the blocking means consists of a single-stage hydraulic jack 9 installed between jaws 1 and 2, by means of its opposite ends and through joints 18, preferably at a reduced distance from pads 5 and 6 fitted on the ends of the latter (i.e. jaws). The activation of blocking jack 9 is operated with a tight closing valve 17, electrically driven by pressure switch 16, with this tight sealing valve consisting of a tight pilot-operated poppet valve.

According to this execution method, clamping jacks 11 and 12 operate by pulling, and the increase in oil pressure is detected on the rod side, in pressure chambers 15A of said jacks, which are connected to the slide valve 20 controlling the opening and closing of jaws 1 and 2, and communicating with pressure switch 16.

One understands that when the tong jaws come into contact with trunk T, the pressure in chambers 15A of clamping jacks 11 and 12 increases to compress rubber pads 5 and 6. This rise in pressure is detected by pressure switch 16 that then electrically controls the tight pilot-operated poppet valve 17 to close oil outlet 19 of jack 9. As a result, the clamping force will be applied on said jack 9 and not on the tree bark.

To open the tongs, the oil pressure must be transmitted to the opening jack 14 and the poppet valve reset to the passing direction (FIG. 1) so as to make sure that the blocking jack 9 is always full of oil.

According to this execution method, the vibrating tongs consist of two moving jaws 1 and 2, but it is understood that the arrangements described above may also be applied to vibrating tongs consisting of one single moving jaw, with the other jaw remaining stationary.

According to the execution method displayed in FIG. 4, the closing of jaws 1 and 2 of the vibrating tongs is achieved through a single clamping jack 11 operating also by pulling. This jack is connected, by means of its ends and through joints 18, to jaws 1 and 2, at a reduced distance from the end portions of said jaws equipped with pads 5 and 6.

In this case, the pressure information is taken in the oil intake chamber 15A on the rod side of the clamping jack 11 to control pressure switch 16 that electrically controls a tight closing valve 17 so that, for example, a tight pilot-operated poppet valve, which closes oil outlet 19 of discharge chamber 15B, i.e. from the bottom side of the clamping jack when an increase in pressure is detected in pressure chamber 15A by the rod side of said clamping jack. The return travel of rod 11A inside the body of the latter is blocked, and a limitation of the clamping pressure on tree trunk T is obtained in this manner.

According to the execution method shown in FIG. 5, the closing of jaws 1 and 2 of the vibrating tongs is achieved through two clamping jacks 11 and 12 which work by pushing.

In this case, the pressure information is taken on the bottom side 15B of clamping jacks 11 and 12 to control a pressure switch 16 that electrically controls a tight closing valve 17, so that, for example, a tight pilot-operated poppet valve that closes oil outlet 19 on the rod side 15A of said jacks when an increase in pressure is detected in pressure chamber 15B, by the bottom side of said clamping jacks. The outward travel of rod 11A, 12A of said jacks is blocked, and a limitation of the clamping force applied by jaws 1 and 2 on tree trunk T is thereby achieved.

We claim:

1. A vibrating tong apparatus having an adaptable clamping force for engaging a tree trunk for fruit harvesting, the apparatus comprising:
    a fixed support;
    a pair of jaws in which at least one jaw of said pair of jaws is mobile, said pair of jaws being pivotally connected at one end thereof to said fixed support, each jaw of said pair of jaws having a free end opposite said fixed support;
    at least one hydraulic jack interconnected to said pair of jaws so as to open and close said pair of jaws;
    a vibrating means cooperatively interconnected to said pair of jaws for communicating vibration to said pair of jaws, said at least one hydraulic jack having an oil intake chamber therein suitable for controlling a movement of said at least one hydraulic jack;
    a pressure detecting means cooperative with said oil intake chamber for detecting an increase of pressure in said oil intake chamber when said pair of jaws contact the tree trunk; and
    a blocking jack directly connected to and extending between said pair of jaws adjacent said free ends of said pair of jaws, said blocking jack cooperative with said pressure detecting means, said blocking jack having a hydraulic fluid supply connected thereto, said pressure detecting means for supplying hydraulic fluid from said hydraulic fluid supply to said blocking jack so as to oppose a force of said pair of jaws upon the tree trunk when said pressure detecting means detects the increase of pressure in said oil intake chamber.

2. The vibrating tong apparatus of claim 1, said pressure detecting means being selectively adjustable.

3. The vibrating tong apparatus of claim 1, said pressure detecting means comprising a pressure switch.

4. The vibrating tong apparatus of claim 1, said pressure detecting means comprising a pressure sensor.

5. The vibrating tong apparatus of claim 1, said at least one hydraulic jack having a cylinder side and a rod side, said pressure detecting means being in communication with said rod side.

6. The vibrating tong apparatus of claim 1, said blocking jack being a single-stage jack having an outlet connected to a tight closing valve.

7. The vibrating tong apparatus of claim 1, said pressure detecting means comprising an adjustable pressure switch electrically controllably connected to a tight closing valve, said tight closing valve being a pilot-operated valve cooperative with an oil outlet of said at least one hydraulic jack.

* * * * *